(12) United States Patent
Psychoudakis et al.

(10) Patent No.: US 10,305,175 B2
(45) Date of Patent: May 28, 2019

(54) WAVEGUIDE AND ANTENNA APPARATUS FOR EXTENDING CONNECTION COVERAGE

(71) Applicant: Samsung Electronics Co., Ltd., Suwon-si (KR)

(72) Inventors: Dimitris Psychoudakis, Plano, TX (US); Daquan Huang, Allen, TX (US); Alireza Foroozesh, Richardson, TX (US); Matthew Tonnemacher, Richardson, TX (US); Gary Xu, Allen, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/672,606

(22) Filed: Aug. 9, 2017

(65) Prior Publication Data

US 2018/0062248 A1 Mar. 1, 2018

Related U.S. Application Data

(60) Provisional application No. 62/379,009, filed on Aug. 24, 2016, provisional application No. 62/406,299, (Continued)

(51) Int. Cl.
*H01Q 1/27* (2006.01)
*H01Q 13/08* (2006.01)
*H04B 1/3827* (2015.01)

(52) U.S. Cl.
CPC ............ *H01Q 1/273* (2013.01); *H01Q 13/08* (2013.01); *H04B 1/385* (2013.01)

(58) Field of Classification Search
None
See application file for complete search history.

(56) References Cited

U.S. PATENT DOCUMENTS

| 4,518,967 A | * | 5/1985 | Westerman | H01Q 13/20 343/770 |
| 4,931,808 A | * | 6/1990 | Lalezari | H01Q 13/26 343/753 |

(Continued)

OTHER PUBLICATIONS

ISA/KR, "International Search Report and Written Opinion of the International Searching Authority," International Application No. PCT/KR2017/008799, dated Nov. 28, 2017, 11 pages.

*Primary Examiner* — Howard Williams

(57) ABSTRACT

A wearable wireless communication device comprises a transceiver positioned on a first side of the device, the transceiver comprising a first antenna configured to receive radio frequency (RF) signals transmitted toward the first side of the device. The device is wearable about an object that attenuates reception, by the first antenna, of RF signals transmitted toward a second side of the device. The device further comprises a waveguide electromagnetically coupled to the transceiver, the waveguide terminating in at least a second antenna positioned on the second side of the device. The second antenna is configured to receive the RF signals transmitted toward the second side of the device. The waveguide is shaped to direct received RF signals around the object to the transceiver. The object may in some embodiments be a piece of human anatomy.

18 Claims, 9 Drawing Sheets

Related U.S. Application Data filed on Oct. 10, 2016, provisional application No. 62/406,334, filed on Oct. 10, 2016, provisional application No. 62/415,882, filed on Nov. 1, 2016.

(56) References Cited

U.S. PATENT DOCUMENTS

| | | |
|---|---|---|
| 2014/0187179 A1* | 7/2014 | Ferguson ............... H01Q 3/24 455/77 |
| 2014/0197937 A1 | 7/2014 | Huang et al. |
| 2015/0215042 A1 | 7/2015 | Guidotti et al. |
| 2015/0372378 A1 | 12/2015 | Anderson et al. |
| 2016/0112991 A1 | 4/2016 | Chen et al. |
| 2016/0149614 A1 | 5/2016 | Barzegar et al. |

* cited by examiner

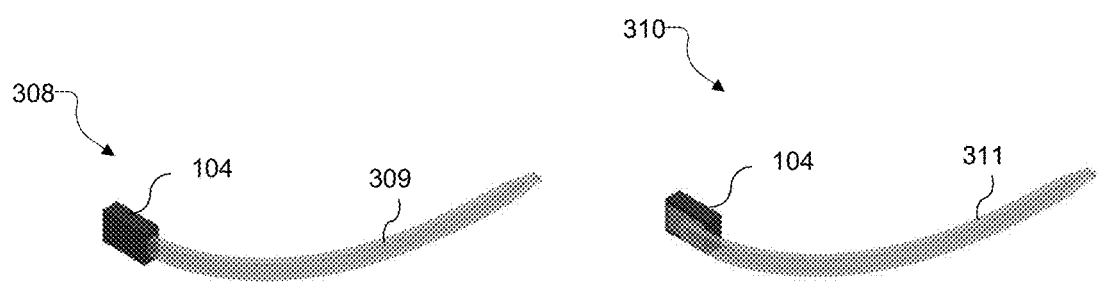
FIG. 3F
FIG. 3G
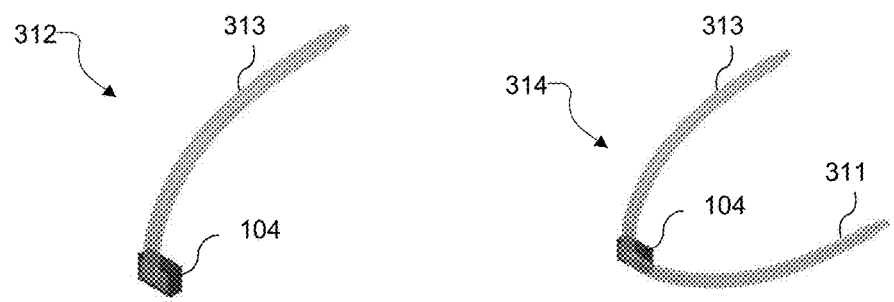
FIG. 3H
FIG. 3I

WAVEGUIDE AND ANTENNA APPARATUS FOR EXTENDING CONNECTION COVERAGE

CROSS-REFERENCE TO RELATED APPLICATION(S) AND CLAIM OF PRIORITY

This application claims priority under 35 U.S.C. § 119(e) to U.S. Provisional Patent Application No. 62/379,009 filed on Aug. 24, 2016; U.S. Provisional Patent Application No. 62/406,299 filed on Oct. 10, 2016; U.S. Provisional Patent Application No. 62/406,334 filed on Oct. 10, 2016; and U.S. Provisional Patent Application No. 62/415,882 filed on Nov. 1, 2016. The above-identified provisional patent applications are hereby incorporated by reference in their entirety.

TECHNICAL FIELD

This disclosure relates generally to wireless signal transmission. More specifically, this disclosure relates to a waveguide and antenna for extending wireless coverage around the body for wearable or body-worn radio frequency (RF) front ends.

BACKGROUND

Wearable devices are increasingly part of daily life for many technology users. Some wearable devices communicate via wireless connections with other devices. For example, wearable computing devices may communicate with desktop computing devices that provide remote processing power to the wearable device, either in lieu of or in addition to onboard processing power, or wearable devices may communicate with mobile phones that relay information to the wearable device for more convenient display to the user. Given the nature of wearable devices and their proximity to the human body, wireless transmissions from wearable devices are affected by RF shadowing caused by human anatomy. That is, the human body may cause attenuation of wireless transmissions from a wearable device, depending on the location of the computing device or devices with which the wearable device is communicating.

SUMMARY

This disclosure provides a dielectric waveguide and antenna apparatus for extending connection coverage for millimeter wave RF front ends by circumventing shadowing caused by the human body.

In a first embodiment, wearable wireless communication device includes a signal source configured to radiate a radio frequency (RF) signal in at least a first direction that is away from an object that is adjacent to the signal source, wherein the object is in a second direction from the signal source and substantially attenuates the RF signal and a waveguide electromagnetically coupled to the signal source such that the RF signal travels along the waveguide, the waveguide terminating in at least one antenna that is directed in the second direction, the waveguide shaped to direct the RF signal around the object. The object may in some embodiments be a piece of human anatomy.

In a second embodiment, a method for wireless communication includes radiating a radio frequency (RF) signal from a signal source in at least a first direction that is away from an object that is adjacent to the signal source, wherein the object is in a second direction from the signal source and substantially attenuates the RF signal. The method further includes electromagnetically coupling the RF signal into a waveguide such that the RF signal travels along the waveguide, the waveguide terminating in at least one antenna that is directed in the second direction, the waveguide shaped to direct the RF signal around the object. The method additionally includes guiding the RF signal through the waveguide to radiate in the second direction from the at least one antenna.

In a third embodiment, a non-transitory computer readable medium embodies a computer program, the computer program including computer readable program code that when executed causes at least one processing device to cause a signal source to radiate a radio frequency (RF) signal from the signal source in at least a first direction that is away from an object that is adjacent to the signal source, wherein the object is in a second direction from the signal source and substantially attenuates the RF signal. The computer readable program code further causes the signal source to electromagnetically couple the RF signal into a waveguide such that the RF signal travels along the waveguide, the waveguide terminating in at least one antenna that is directed in the second direction, the waveguide shaped to direct the RF signal around the object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 3C-3J illustrates alternative example waveguide structures of an HMD according to this disclosure;

DETAILED DESCRIPTION

FIGS. 1A through 5, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Examples of the present disclosure understand that streaming content delivery over a wireless connection is demanding of high bandwidth and a reliable connection, and interruptions in the wireless connection may be disruptive for a user that is experiencing the streaming content. In cases where the streaming content is virtual reality (VR) or augmented reality (AR) content, interruptions in service may be particularly jarring, and may remove the user from an immersive experience. Moreover, streaming of VR or AR content may be even more demanding of high bandwidth than streaming of other content, such as video or music. In order to meet these bandwidth demands, a high frequency (e.g., 60 GHz) communication link can be used to handle the amount of data involved in VR or AR experiences.

When a user is wearing a body mounted device, such as a headset, that provides a VR or AR experience, the device may be closely attached to the user's anatomy, and the user's anatomy will likely attenuate a high frequency wireless signal that passes through the user's anatomy. If the user is not moving, this may not cause issues so long as the user faces their body mounted device towards the signal source. However, if a user is involved in a VR or AR experience that allows or encourages the user to move and rotate to engage in the experience, then signal loss due to tissue attenuation could cause interruptions in the wireless link as the user rotates so that the signal source of the body mounted device is blocked by the user's anatomy from the device that is streaming content to the body mounted device. Accordingly, the user may experience interruptions in the experience based on their orientation relative to the streaming content source.

Figure 1A:
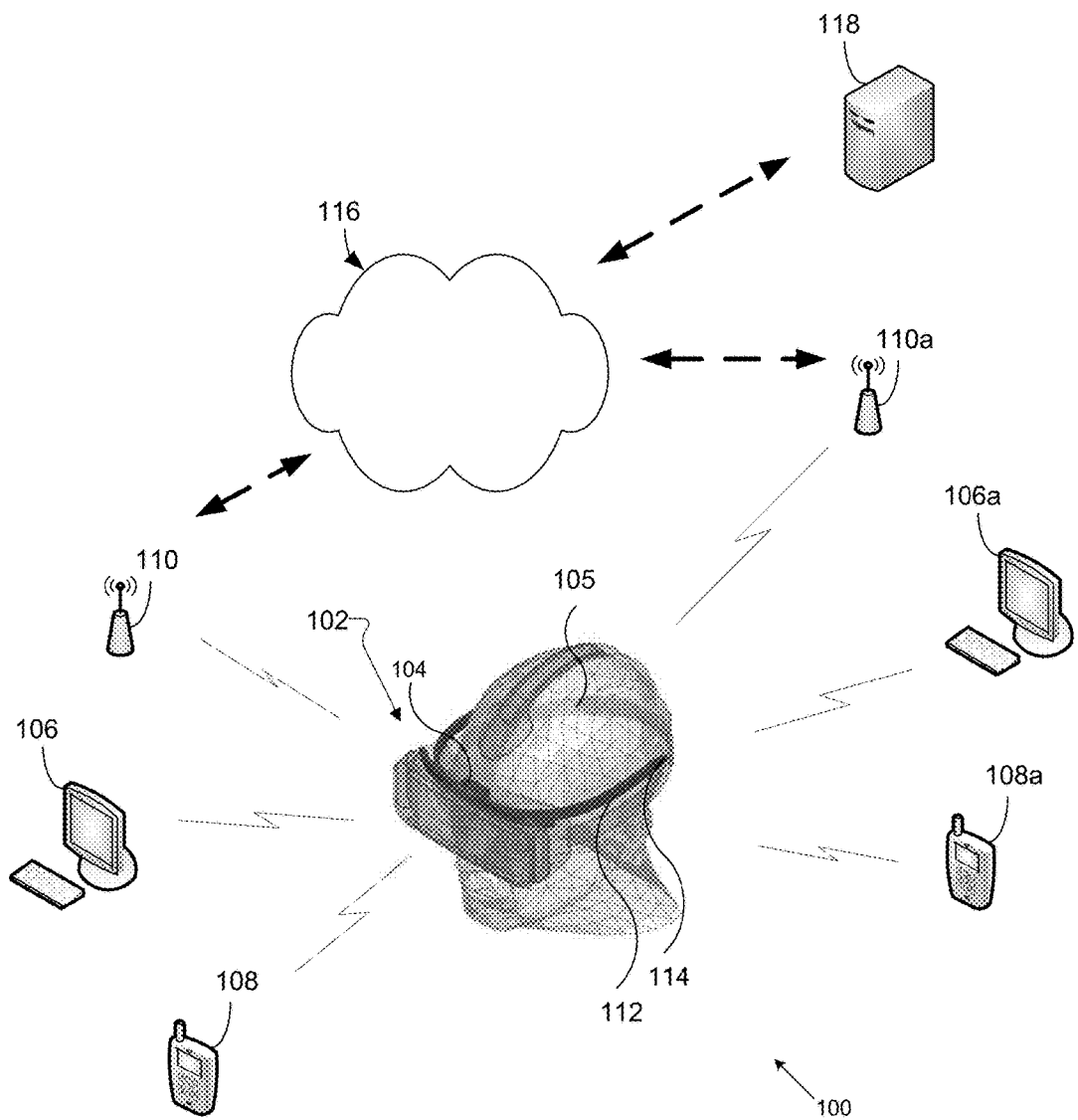
FIGS. 1A and 1B illustrate example communication systems according to this disclosure.
Figure 1B:
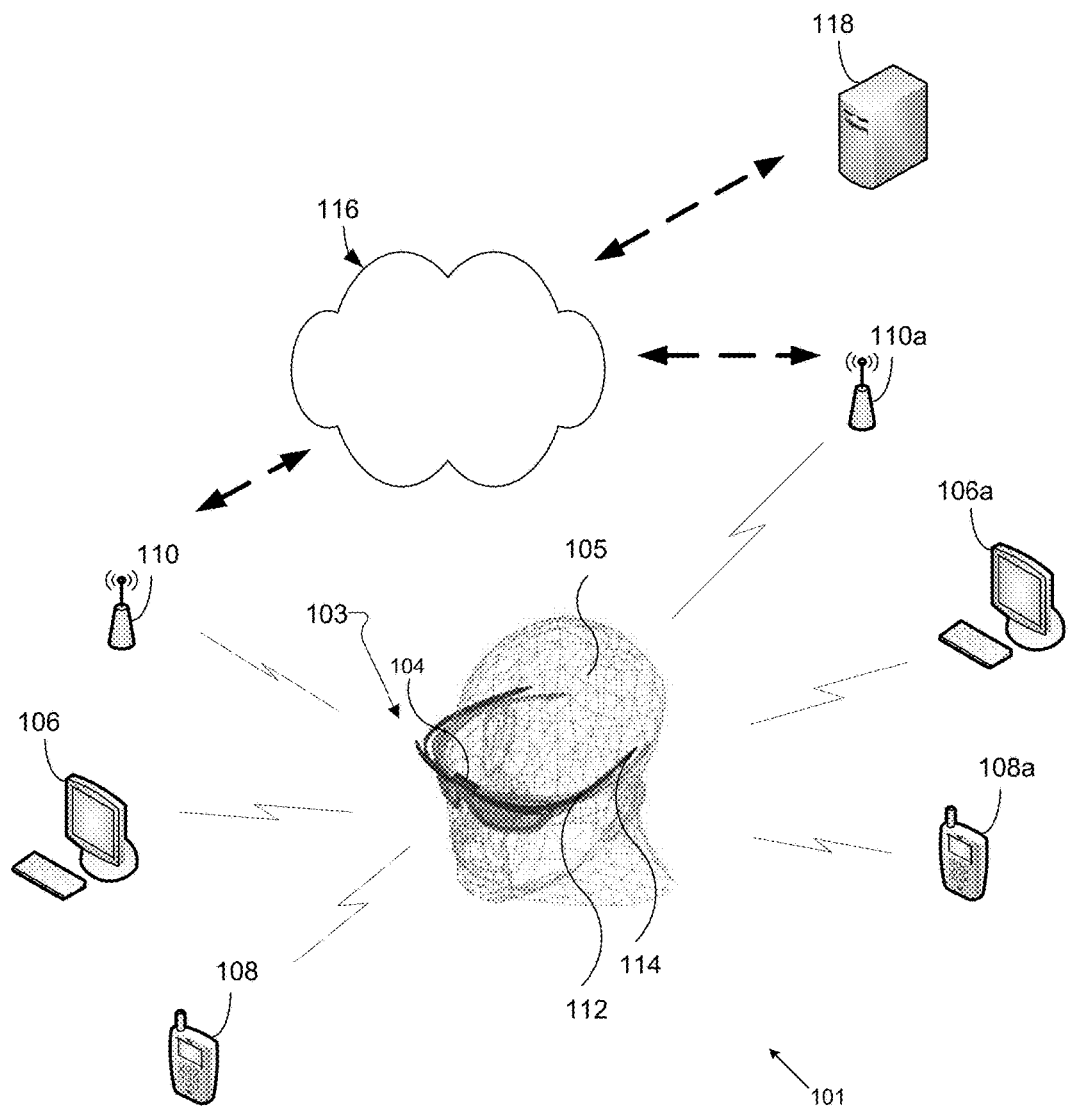

FIGS. 1A and 1B illustrate example communication systems 100 and 101 according to this disclosure. The embodiment of the communication systems 100 and 101 shown in FIGS. 1A and 1B are for illustration only. Other embodiments of the communication systems 100 and 101 may be used without departing from the scope of this disclosure.

As shown in FIG. 1A, the system 100 includes a body mounted device 102, which in this embodiment is a head mountable device (HMD). In particular, the HMD 102 is a VR headset. The HMD 102 communicates with one or more computing devices 106, 108, or 118. For example, the computing devices 106, 106a, 108, 108a, or 118 may include a desktop computer or video game console 106 or 106a, a mobile phone 108 or 108a, or a server 118. In the example of FIG. 1A, the HMD 102 may communicate with a server 118 via a base station or wireless router 110 or 110a and a network 116. The network 116 may be a local area network such as a Wi-Fi™ network, a wide area network such as the Internet, or any other appropriate network.

The HMD 102 may include a transceiver 104, located on a first side of the HMD 102, that facilitates communication with the computing devices 106, 106a, 108, or 108a, or with the router 110 or 110a. For example, the transceiver 104 may include an antenna that allows transmission and reception of signals. The HMD 102 may communicate with the computing devices 106, 106a, 108, 108a, or 118 for various purposes, such as to use the computing devices 106, 106a, 108, 108a, or 118 for remote processing. For example, the computing devices 106, 106a, 108, 108a, or 118 may provide VR content for display to a user via the HMD 102. In other embodiments, the computing devices 106, 106a, 108, 108a, or 118 may provide notifications, web site information, application information, or the like for display via the HMD 102. The HMD 102 may, in some embodiments, use the transceiver 104 to communicate with a base station 110 which relays communications to a computing device 118 via a network 116, such as the Internet. In some embodiments, the computing devices may include, for example, a desktop computer 106 or 106a, a mobile phone 108 or 108a, or a server 118.

While an antenna contained in the transceiver 104 may omnidirectionally radiate and receive RF energy, the anatomy 105 of the user of the HMD 102 attenuates RF energy that is radiated towards the transceiver 104 from a second side of the HMD 102, or radiated from the transceiver 104 towards the second side of the HMD 102, through the anatomy 105 of the user. In particular, the higher frequency the RF signal, the more susceptible it is to attenuation by anatomy 105. Such attenuation may be referred to as body shadowing. In the example of FIG. 1A, this anatomy 105 is illustrated as a head. It is understood that the HMD 102 may, in some embodiments, be a device that is mounted to another part of the anatomy 105, such as a wrist, an arm, a chest, or the like, of a user. In any case, the anatomy 105 of the user attenuates the wireless signal of the HMD 102 when communicating with devices 106a, 108a, or 110a that are on an opposite side of the anatomy 105 from the transceiver 104.

In some embodiments, the HMD 102 may include one or more waveguides 112 that are coupled to the transceiver 104 such that the waveguides 112 guide RF energy to and from the transceiver 104 around the anatomy 105 of the user. Each end of a waveguide 112 may terminate in dielectric rod antenna structures 114 that effectively receive and radiate the RF energy that is carried by the waveguide 112. For example, when receiving signals from electronic devices 106a or 108a, or router 110a, that are on an opposite side of the user's anatomy 105 from the transceiver 104 (i.e., that are on the second side of the HMD 102), the dielectric rod antenna structures 114 receive RF energy radiated by the electronic devices from the second side of the HMD 102 and the waveguide 112 guides the energy to the transceiver 104. In some embodiments, omnidirectional RF radiation towards the transceiver 104 from electronic devices 106 or 108, or router 110, that are not blocked by anatomy 105 of the user (i.e., that are on the first side of the HMD 102), is received directly by an antenna contained in the transceiver 104. In other embodiments, the waveguide 112 is coupled to the transceiver 104 in such a way that incoming RF radiation from the first side of the HMD 102 is captured by the waveguide 112 rather than the transceiver 104. In some embodiments, both an antenna in the transceiver 104 and the waveguide 112 may receive incoming RF radiation from the first side of the HMD 102. In embodiments with more than one waveguide 112, RF energy may be received from more than one direction by the waveguides 112. For example, one waveguide 112 may receive RF energy from the back of the user's anatomy 105, from the second side of the HMD 102, and a second waveguide 112 may receive RF energy from either side of the user's anatomy 105 which correspond to third and fourth sides of the HMD 102. Additionally or alternatively, another waveguide 112, such as the waveguide shown in FIG. 3H, may receive RF energy from above the user's anatomy 105, which may correspond to a fifth side of the HMD 102.

Similarly, when transmitting signals to electronic devices 106a or 108a, or router 110a, that are on an opposite side of the user's anatomy 105 from the transceiver 104, the waveguide 112 guides the energy to from the transceiver 104 towards the dielectric rod antenna structures 114 that radiate RF energy towards the electronic devices. In some embodiments, the an antenna in transceiver 104 continues to be able to omnidirectionally radiate energy while the waveguide 112 is coupled to the transceiver 104, and the transceiver 104 is thus able to directly transmit signals to the electronic devices 106 or 108, or router 110, that are on the same side of the anatomy 105 as the transceiver 104. In other embodiments, substantially all of the RF energy radiated from the antenna of transceiver 104 is coupled through the waveguides 112, and very little or no RF energy is radiated forward from the transceiver 104 towards electronic devices 106 or 108, or router 110. In embodiments with more than one waveguide 112, RF energy may be radiated in more than one direction out of the waveguides 112. For example, one waveguide 112 may radiate RF energy towards the back of the user's anatomy 105, and a second waveguide 112 may radiate RF energy towards either side of the user's anatomy 105.

As described in further detail below, the waveguides 112 may be dielectric waveguides. For example, a waveguide 112 may be formed of a solid dielectric material, which contains and directs energy of the RF signal that is coupled through the waveguide 112 to a dielectric rod antenna 114, which is the terminating structure of the waveguide 112 on either side of the anatomy 105 of the user (although only one side of the user's head is visible in the view of FIG. 1A). In other embodiments, the waveguides 112 may be slotted metal waveguides, or any other suitable waveguide or traveling wave antenna structure.

In some embodiments, the network 116 may communicate Internet Protocol (IP) packets, frame relay frames, or other information between network addresses. The network 116 may include one or more local area networks (LANs); metropolitan area networks (MANs); wide area networks (WANs); all or a portion of a global network, such as the Internet; or any other communication system or systems at one or more locations.

The network 116 may facilitate communications between a server 118 and the HMD 102. The HMD 102 may, for example, include one or more processors, one or more memories storing instructions and data, and one or more network interfaces facilitating communication over the network 116 via the router or base station 110.

As shown in FIG. 1B, the system 101 includes a body mounted device 103, which in this embodiment is a head mountable device (HMD). In particular, the HMD 103 is an AR headset. The HMD 103 communicates with one or more computing devices 106, 108, or 118. For example, the computing devices 106, 106a, 108, 108a, or 118 may include a desktop computer 106 or 106a, a mobile phone 108 or 108a, or a server 118. In the example of FIG. 1A, the HMD 102 may communicate with a server 118 via a base station or wireless router 110 or 110a and a network 116. The network 116 may be a local area network such as a Wi-Fi™ network, a wide area network such as the Internet, or any other appropriate network.

The HMD 103 may include a transceiver 104 that facilitates communication with the computing devices 106, 106a, 108, or 108a, or with the router 110 or 110a. For example, the transceiver 104 may include an antenna that allows transmission and reception of signals. The HMD 103 may communicate with the computing devices 106, 106a, 108, 108a, or 118 for various purposes, such as to use the computing devices 106, 106a, 108, 108a, or 118 for remote processing. For example, the computing devices 106, 106a, 108, 108a, or 118 may provide AR content for display to a user via the HMD 103. In other embodiments, the computing devices 106, 106a, 108, 108a, or 118 may provide notifications, web site information, application information, or the like for display via the HMD 103. The HMD 103 may, in some embodiments, use the transceiver 104 to communicate with a base station 110 which relays communications to a computing device 118 via a network 116, such as the Internet. In some embodiments, the computing devices may include, for example, a desktop computer 106 or 106a, a mobile phone 108 or 108a, or a server 118. Otherwise, the system 101 of FIG. 1B may be substantially the same as the system 100 of FIG. 1A. Further references to the HMD 102 in this document are understood to apply to the HMD 103 as well.

Although FIGS. 1A and 1B illustrate examples of communication systems 100 and 101, various changes may be made to FIGS. 1A and 1B. For example, the systems 100 and 101 may include any number of each component in any suitable arrangement. In general, computing and communication systems come in a wide variety of configurations, and FIGS. 1A and 1B do not limit the scope of this disclosure to any particular configuration. While FIGS. 1A and 1B illustrate one operational environment in which various features disclosed in this patent document can be used, these features may be used in any other suitable system.

Figure 2:
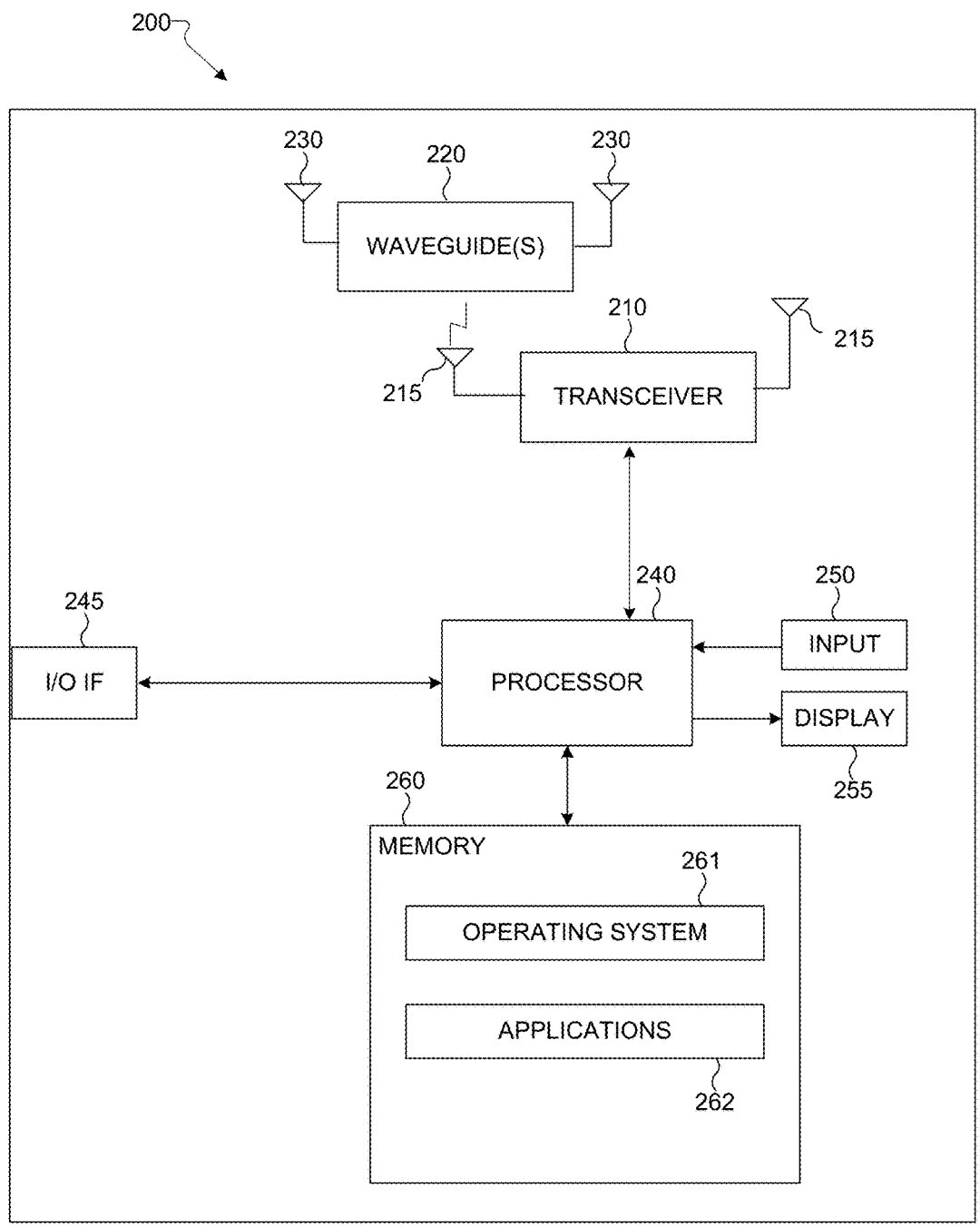
FIG. 2 illustrates an example head mountable device (HMD) that is capable of transmitting signals using a waveguide according to this disclosure.

FIG. 2 illustrates an example HMD 200 that is capable of transmitting signals using a waveguide according to this disclosure. In particular, FIG. 2 illustrates an embodiment of an HMD 102 or an HMD 103. For example, the HMD 200 could represent a VR headset, a mobile phone designed to be combined with a VR accessory, such as a headset, or an AR headset. In other embodiments, the HMD 200 may be a device designed for wear on an arm, chest, or other piece of anatomy. For example, the HMD 200 could be a heart rate monitor designed for wear around a chest or a digital music player or mobile phone designed for wear in an armband. For simplicity, the HMD 200 will be described as a VR headset.

As shown in FIG. 2, the HMD 200 includes a transceiver 210 that may include, for example, a radio frequency (RF) transceiver, a Wi-Gig™ transceiver, an IEEE 802.11ad transceiver, a 5G New Radio (NR) transceiver, or other high frequency (e.g., millimeter wave or THz) transceiver. The HMD 200 also includes antennas 215, one or more waveguides 220, antennas 230, processor 240, an input/output (I/O) interface (IF) 245, an input interface 250, a display 255, and a memory 260. The memory 260 includes an operating system (OS) program 261 and one or more applications 262. In some embodiments, the HMD 200 also functions as a mobile phone.

The transceiver 210 may receive or transmit an RF signal such as a Wi-Gig™ IEEE 802.11ad, or millimeter wave signal. The transceiver 210 may down-convert an incoming RF signal to generate an intermediate frequency (IF) or baseband signal, then generate a processed baseband signal by filtering, decoding, and/or digitizing the baseband or IF signal. The transceiver 210 transmits the processed baseband signal to the processor 240 for further processing (such as for web browsing data, online gameplay data, notification data, or other message data). Alternatively, the transceiver 210 may up-convert an outgoing RF signal from an IF or baseband signal, to generate an RF signal.

The transceiver 210 may transmit outgoing RF signals and receive incoming signals through one or more antennas 215, which may in some embodiments face towards the front of a user's anatomy 105. The transceiver 210 may electromagnetically couple to waveguide(s) 220 which may fully or partially capture incoming or outgoing RF radiation, directing some or all of the outgoing RF radiation towards antennas 230, and directing incoming RF radiation from antennas 230 to transceiver 210. In some embodiments, the transceiver 210 couples to the waveguide(s) 220 through the antennas 215. In some embodiments, the antennas 215 may comprise an antenna array, and antenna selection or beamforming may be used to provide optimum coupling with the waveguide(s) 220.

In some embodiments, antennas 230 are rod antennas that terminate the ends of waveguide 220. In some embodiments, as further described below, the waveguide 220 may radiate an outgoing RF signal from more than two antennas 230, and may receive incoming RF signals from more than two antennas 230. In other embodiments, more than one waveguide 220 may be electromagnetically coupled to the transceiver 210 to allow for guiding outgoing RF radiation in multiple different directions, and receiving incoming RF radiation from multiple different directions.

The transceiver 210 also receives or transmits analog or digital voice data or other outgoing baseband data (such as web data, e-mail, interactive video game data, virtual reality, or augmented reality content) from the processor 240. The transceiver 210 encodes, multiplexes, and/or modulates the outgoing baseband data to generate a processed baseband or IF signal. In the case that the transceiver 210 is an RF transceiver, the transceiver 210 up-converts the baseband or IF signal to an RF signal that is transmitted via one or more antennas 215 or 230.

The processor 240 can include one or more processors or other processing devices that execute the OS 261 stored in the memory 260 in order to control the overall operation of the HMD 200. For example, the processor 240 could control the reception of forward channel signals and the transmission of reverse channel signals by the transceiver 210 in accordance with well-known principles. In some embodiments, the processor 240 includes at least one microprocessor, microcontroller, or other baseband processing unit like a Field Programmable Gate Array (FPGA).

The processor 240 is also capable of executing other processes and programs resident in the memory 260. The processor 240 can move data into or out of the memory 260 as required by an executing process. In some embodiments, the processor 240 is configured to execute the applications 262 based on the OS 261 or in response to an input of commands from a user via input interface 250. The processor 240 is also coupled to the I/O interface 245, which provides the HMD 200 with the ability to connect to other devices such as laptop computers and handheld computers. The I/O interface 245 is the communication path between these accessories and the processor 240.

The processor 240 is also coupled to the input interface 250 and the display 255. The user of the HMD 200 can use the input interface 250 to enter data into the HMD 200. The input interface 250 may further include buttons, switches, a microphone, or the like that allow input of commands to the HMD 200. The display 255 may be a liquid crystal display, light emitting diode (LED) display, organic light emitting diode (OLED) display, or other display capable of rendering a virtual reality or augmented reality environment, including rendering text and/or graphics in the virtual or augmented reality environment.

The memory 260 is coupled to the processor 240. Part of the memory 260 could include a random access memory (RAM), and another part of the memory 260 could include a Flash memory or other read-only memory (ROM).

Although FIG. 2 illustrates an example of an HMD, various changes may be made to FIG. 2. For example, various components in FIG. 2 could be combined, further subdivided, or omitted and additional components could be added according to particular needs. As a particular example, any number of waveguides 220 may be included in the HMD 200, and a waveguide 220 may terminate in any number of antennas 230, which may direct RF radiation in different directions, as will be shown further below. In addition, as with computing and communication networks, electronic devices and computer systems can come in a wide variety of configurations, and FIG. 2 does not limit this disclosure to any particular HMD.

Figures 3A, 3B:
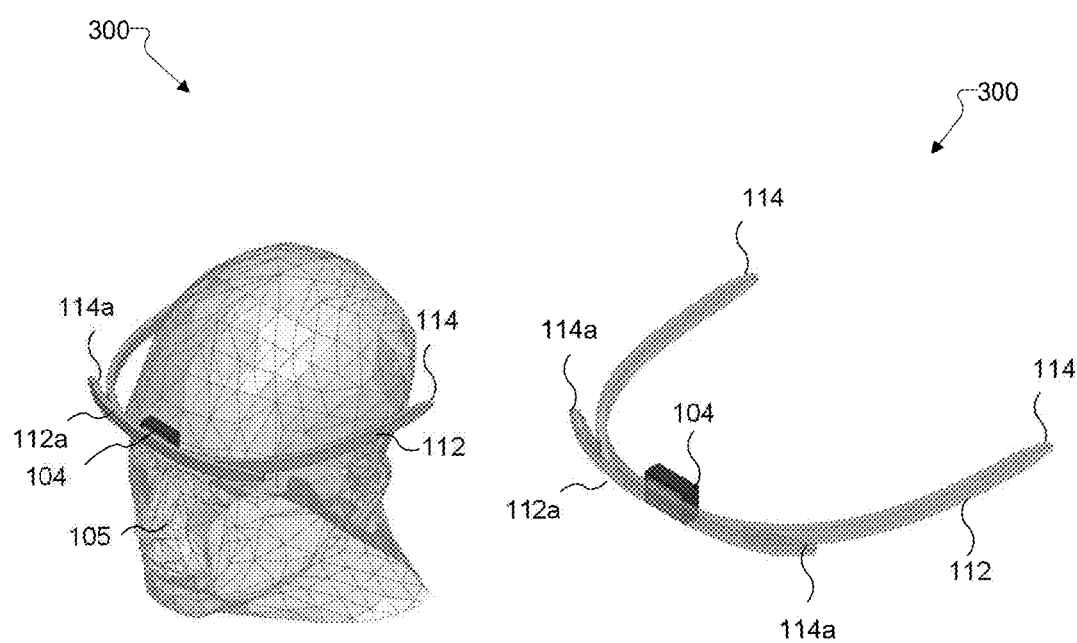
FIGS. 3A and 3B illustrate an example waveguide structure of an HMD according to this disclosure.

FIGS. 3A and 3B illustrate an example waveguide structure 300 of the HMD 102 of FIG. 1A according to illustrative embodiments of the present disclosure. FIG. 3A illustrates the waveguide structure 300 superimposed on the anatomy 105 that the waveguide structure 300 is designed to circumvent. FIG. 3B illustrates the waveguide structure 300 without the anatomy 105 for clarity. In this example, as in FIG. 1A, the anatomy 105 that causes attenuation of RF signal is the user's head.

In the embodiment of FIGS. 3A and 3B, the waveguide structure 300 includes two waveguides 112 and 112a that are electromagnetically coupled to the transceiver 104. Each of the waveguides 112 and 112a terminates in a dielectric rod antenna 114 or 114a, respectively, at each end of the waveguide 112 or 112a.

In this embodiment, a first waveguide 112 has a horseshoe or U shape that is designed to wrap around a user's head. The dielectric rod antennas 114 at the ends of waveguide 112 face backwards relative to the user's head, towards a second side of the HMD 102. As described above, the waveguide 112 is electromagnetically coupled to the transceiver 104, thereby guiding incoming RF radiation, that is directed at the back of the user and received by the dielectric rod antennas 114, around the user's head to the transceiver 104. Similarly, the waveguide 112 guides outgoing RF radiation from the transceiver 104 around the user's head towards the dielectric rod antennas 114, causing the RF radiation to radiate from the antennas 114 away from the back of the user. In this way, body shadowing caused by the head on the second side of the HMD 102 may be reduced or eliminated.

A second waveguide 112a has a substantially linear shape as illustrated in FIGS. 3A and 3B. The dielectric rod antennas 114a at the ends of waveguide 112a face to each side of the user's head, which correspond to third and fourth sides of the HMD 102. As described above, the waveguide 112a is electromagnetically coupled to the antenna 104, thereby guiding incoming RF radiation from either side of the user's head, that is received by the antennas 114a, from the antennas 114a to the transceiver 104. Similarly, the waveguide 112a guides outgoing RF radiation from the transceiver 104 to each side of the user's head and causes the outgoing RF radiation to radiate from the antennas 114a. While the anatomy 105 may not cause body shadowing on the third and fourth sides of the HMD 102 even without a waveguide, the RF radiation directly received at and transmitted by the transceiver 104 in these directions may be relatively weak, and the waveguide 112a may reinforce the signal.

In this manner, the waveguides 112 and 112a can create strong signal coverage in a nearly 360 degree area for high frequency signals received by and transmitted from the HMD 102. This can allow the user to move and rotate freely without losing wireless connection with a stationary device, such as a mobile phone 108 or 108a that may be plugged into a charging station, a desktop computer 106 or 106a, or a wireless router or base station 110 or 110a. The user can, therefore, experience seamless VR content without interruptions in connection to a streaming content delivery source.

The waveguides 112 and 112a may be shaped so that they fit inside of the form factor of an HMD 102 that the waveguides are built into. For example, the waveguide 112 may be shaped to fit inside a headband that holds the HMD 102 in place on the user's head. Similarly, the waveguide 112a may be shaped to fit inside a portion of the HMD 102 that fits over the user's eyes to provide a display to the user. In this way, the waveguides 112 and 112a can be integrated into the HMD 102 without altering the aesthetic appearance of the HMD 102.

As described above, the waveguides 112 and 112a may be formed of a solid dielectric material. A dielectric waveguide holds electromagnetic radiation less completely than a hollow metal waveguide, and at points where the dielectric waveguide bends sharply, the signal carried on the waveguide may be captured by the waveguide or may radiate out of the waveguide in a similar manner as if an antenna were present. In this way, it may be possible to create multiple points along a dielectric waveguide where an RF signal is received by or radiated off of the waveguide without an explicit antenna structure, as the bend in the waveguide acts as a radiating antenna. In some embodiments, the waveguide may have a metal coating applied to one or more sides, which can enhance the ability of the waveguide to support a guided wave of electromagnetic radiation. In other embodiments, the waveguide can be made out of hollow, slotted metal, a stripline, or a microstrip line, rather than a dielectric.

The dielectric rod antennas 114 and 114a may be formed of the same dielectric material as the waveguides 112 and 112a. The dielectric rod antennas 114 and 114a may be formed by tapering the dielectric waveguide material. The angle of the taper and the length of the taper of dielectric rod antennas 114 and 114a affects the shape and size of the lobes of the antenna. More specifically, the longer tapered portion is, the more directed the front lobe of the antenna will be. However, an outgoing signal will radiate from, and an incoming signal will be received by, the end of the waveguides 112 and 112a even without any taper. Furthermore, any discontinuity or alteration of the dielectric waveguide may act as a radiator and therefore an antenna.

Although FIGS. 3A and 3B illustrate one example of a waveguide structure 300, various changes may be made to FIGS. 3A and 3B. For example, more or fewer waveguides could be included in the waveguide structure 300, or other types of waveguides could be used in the waveguide structure 300, so long as they can be formed into the proper shapes.

FIGS. 3C-3J illustrate alternative example waveguide structures 302-316 of the HMD 102 according to illustrative embodiments of the present disclosure. FIGS. 3C-3I are illustrated without any anatomy 105, but it is understood that the waveguide structures 302-314 of FIGS. 3C-3I illustrate waveguide structures intended for use with a HMD 102 that is mounted on a user's head, and accordingly they are designed to address the same issue as the waveguide structure 300 of FIGS. 3A and 3B.

Figure 3C:
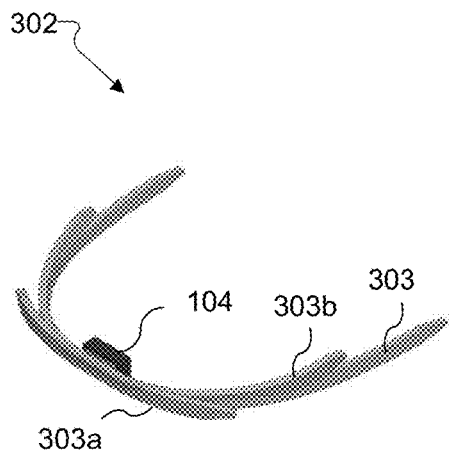

FIG. 3C illustrates an example waveguide structure 302 that includes 3 waveguides 303, 303a, and 303b, each of which terminates in rod antennas at each end. The waveguides 303 and 303a are substantially the same as those of waveguide 112 and 112a of the structure 300 of FIGS. 3A and 3B. The third waveguide 303b terminates in rod antennas that are directed at a shallow angle away from the waveguide 303. As a result, the waveguide structure 302 may have stronger signal coverage in the area that is between the area covered by waveguides 303 and 303a.

Figure 3D:
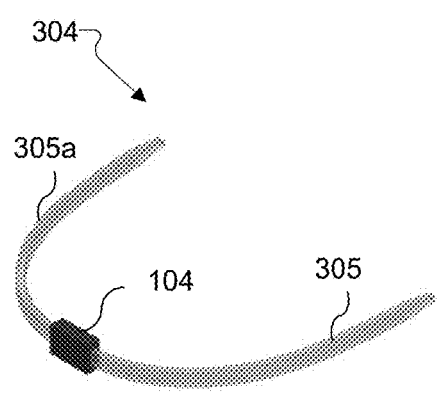

FIG. 3D illustrates an example waveguide structure 304 in which the waveguides 305 and 305a are inserted into the side of the module containing transceiver 104, which provides an alternative manner of electromagnetically coupling the waveguides 305 and 305a to the transceiver 104.

Figure 3E:
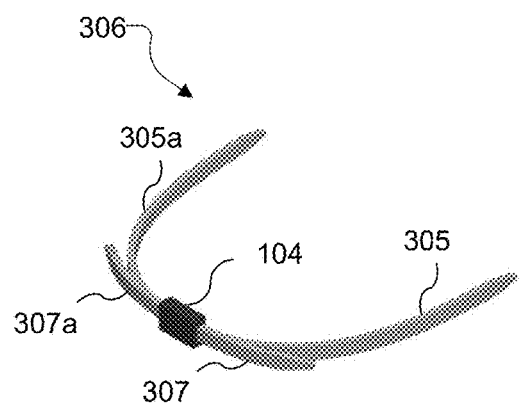

FIG. 3E illustrates an example waveguide structure 306 that is similar to waveguide structure 304 with the addition of a second set of waveguides 307 and 307a to provide coverage area similar to the waveguide structure 300. The waveguides 305, 305a, 307, and 307a are inserted into the side of the module containing transceiver 104 to electromagnetically couple with the transceiver 104.

FIGS. 3F-3H illustrate example waveguide structures 308, 310, and 312 that include various single sided waveguides 309, 311, and 313, respectively. Waveguides 309 and 311 illustrate clearly the different modes of coupling a waveguide to the transceiver 104. Waveguide 309 couples to the transceiver 104 by interfacing with the side of the module containing transceiver 104. Waveguide 311 couples to the transceiver 104 by attaching to the exterior of the module containing transceiver 104. Waveguide 313 illustrates a waveguide that is formed to go over top of a user's head rather than around the side of a user's head. This may correspond to a fifth side of the HMD 102.

FIG. 3I illustrates a waveguide structure 314 that is a combination of waveguides 311 and 313. Waveguide structure 314 illustrates that any number of different waveguide configurations may be created by coupling multiple waveguides to the transceiver 104.

Figure 3J:
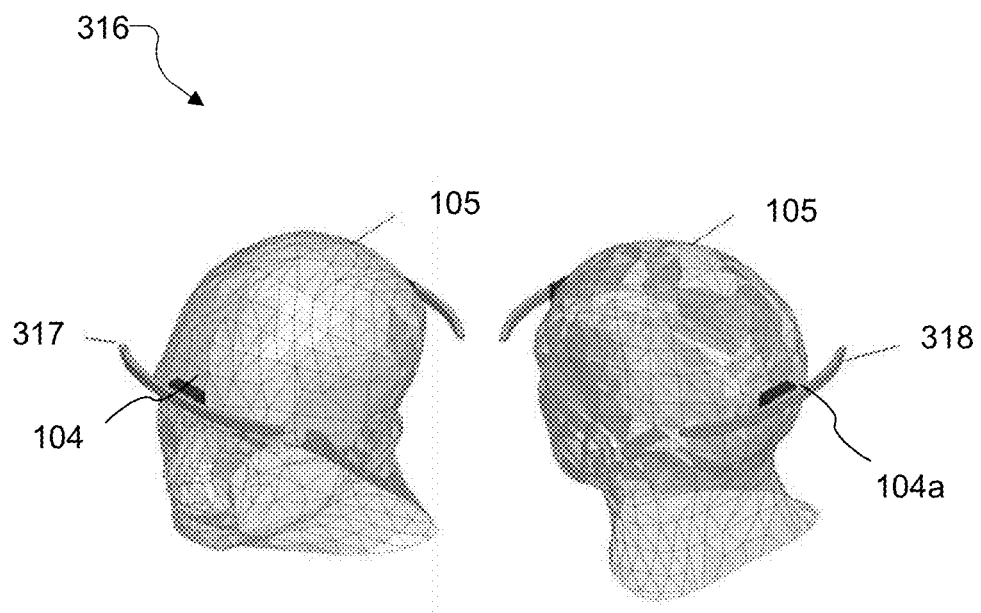

FIG. 3J illustrates an example waveguide structure 316 that contains two antennas 104 and 104a. Each transceiver 104 and 104a has a waveguide 317 and 318, respectively, coupled to it. It is possible to have any number of antennas included in an HMD 102, which can further boost signal strength and prevent loss of connection while moving around relative to computing devices with which the HMD 102 is communicating.

Although FIGS. 3C-3J illustrate examples of waveguide structures, various changes may be made to FIGS. 3C-3J. For example, more or fewer waveguides or antennas could be included in each waveguide structure, or non-dielectric waveguides could be used in the waveguide structure 300, so long as they are formed into the proper shapes.

Figure 4:
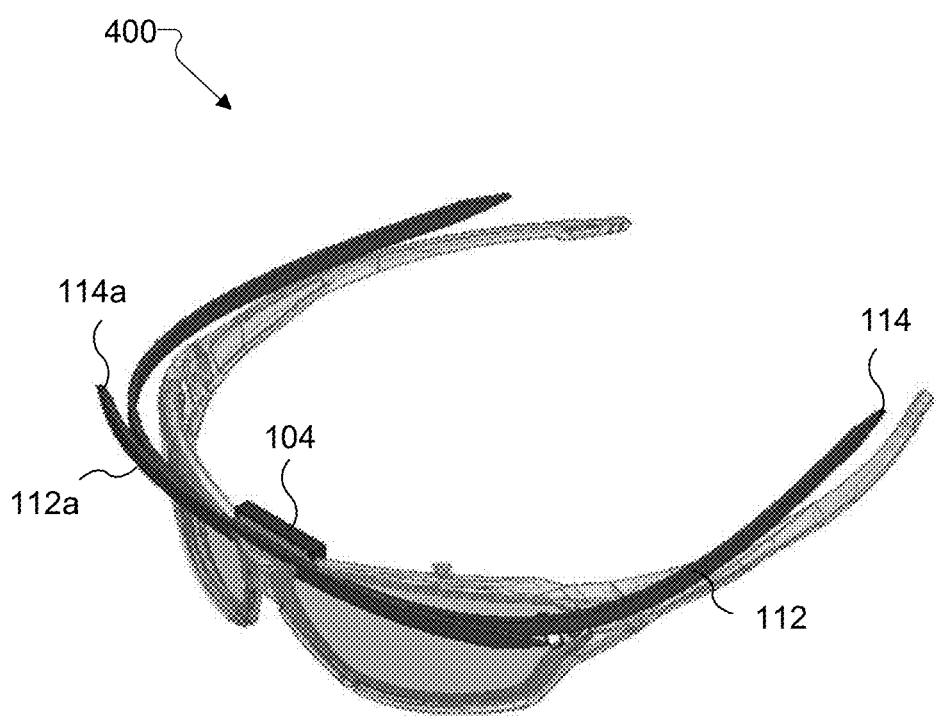
FIG. 4 illustrates an example waveguide structure of an HMD according to illustrative embodiments of the present disclosure.

FIG. 4 illustrates an example waveguide structure 400 of the HMD 103 of FIG. 1B according to illustrative embodiments of the present disclosure. Although FIG. 4 illustrates the waveguide structure 400 without the anatomy 105 for clarity, it is understood that the HMD 103 is worn on the user's head in this example.

In the embodiment of FIG. 4, the waveguide structure 400 includes two waveguides 112 and 112a that are electromagnetically coupled to the transceiver 104. Each of the waveguides 112 and 112a terminates in a dielectric rod antenna 114 or 114a, respectively, at each end of the waveguide 112 or 112a.

In this embodiment, a first waveguide 112 has a horseshoe or U shape that is designed to wrap around a user's head. The dielectric rod antennas 114 at the ends of waveguide 112 face backwards relative to the user's head, towards a second side of the HMD 102. As described above, the waveguide 112 is electromagnetically coupled to the transceiver 104, thereby guiding incoming RF radiation, that is directed at the back of the user and received by the dielectric rod antennas 114, around the user's head to the transceiver 104. Similarly, the waveguide 112 guides outgoing RF radiation from the transceiver 104 around the user's head towards the dielectric rod antennas 114, causing the RF radiation to radiate from the antennas 114 away from the back of the user. In this way, body shadowing caused by the head on the second side of the HMD 102 may be reduced or eliminated.

A second waveguide 112a has a substantially linear shape as illustrated in FIG. 4. The dielectric rod antennas 114a at the ends of waveguide 112a face to each side of the user's head, which correspond to third and fourth sides of the HMD 102. As described above, the waveguide 112a is electromagnetically coupled to the antenna 104, thereby guiding incoming RF radiation from either side of the user's head, that is received by the antennas 114a, from the antennas 114a to the transceiver 104. Similarly, the waveguide 112a guides outgoing RF radiation from the transceiver 104 to each side of the user's head and causes the outgoing RF radiation to radiate from the antennas 114a. While the anatomy 105 may not cause body shadowing on the third and fourth sides of the HMD 102 even without a waveguide, the RF radiation directly received at and transmitted by the transceiver 104 in these directions may be relatively weak, and the waveguide 112a may reinforce the signal.

In this manner, the waveguides 112 and 112a can create strong signal coverage in a nearly 360 degree area for high frequency signals received by and transmitted from the HMD 102. This can allow the user to move and rotate freely without losing wireless connection with a stationary device, such as a mobile phone 108 or 108a that may be plugged into a charging station, a desktop computer 106 or 106a, or a wireless router or base station 110 or 110a. The user can, therefore, experience seamless AR content without interruptions in connection to a streaming content delivery source.

The waveguides 112 and 112a may be shaped so that they fit along the form factor of an HMD 103 that the waveguides are built into. For example, the waveguide 112 may be shaped to fit along a headband or ear pieces that hold the HMD 103 in place on the user's head. Similarly, the waveguide 112a may be shaped to fit along the front of a portion of the HMD 103 that fits over the user's eyes to provide a display to the user.

As described above, the waveguides 112 and 112a may be formed of a solid dielectric material. A dielectric waveguide holds electromagnetic radiation less completely than a hollow metal waveguide, and at points where the dielectric waveguide bends sharply, the signal carried on the waveguide may be captured by the waveguide or may radiate out of the waveguide in a similar manner as if an antenna were present. In this way, it may be possible to create multiple points along a dielectric waveguide where an RF signal is received by or radiated off of the waveguide without an antenna structure. In some embodiments, the waveguide may have a metal coating applied to one or more sides, which can enhance the ability of the waveguide to support a guided wave of electromagnetic radiation. In other embodiments, the waveguide can be made out of hollow, slotted metal, a stripline, or a microstrip line, rather than a dielectric.

The dielectric rod antennas 114 and 114a may be formed of the same dielectric material as the waveguides 112 and 112a. The dielectric rod antennas 114 and 114a may be formed by tapering the dielectric waveguide material. The angle of the taper and the length of the taper of dielectric rod antennas 114 and 114a affects the shape and size of the lobes of the antenna. More specifically, the longer tapered portion is, the more directed the front lobe of the antenna will be. However, an outgoing signal will radiate from, and an incoming signal will be received by, the end of the waveguides 112 and 112a even without any taper.

Although FIG. 4 illustrates one example of a waveguide structure 400, various changes may be made to FIG. 4. For example, more or fewer waveguides, such as those shown in FIGS. 3C-3I, could be included in the waveguide structure 400, or other types of waveguides could be used in the waveguide structure 400, so long as they can be formed into the proper shapes.

Figure 5:
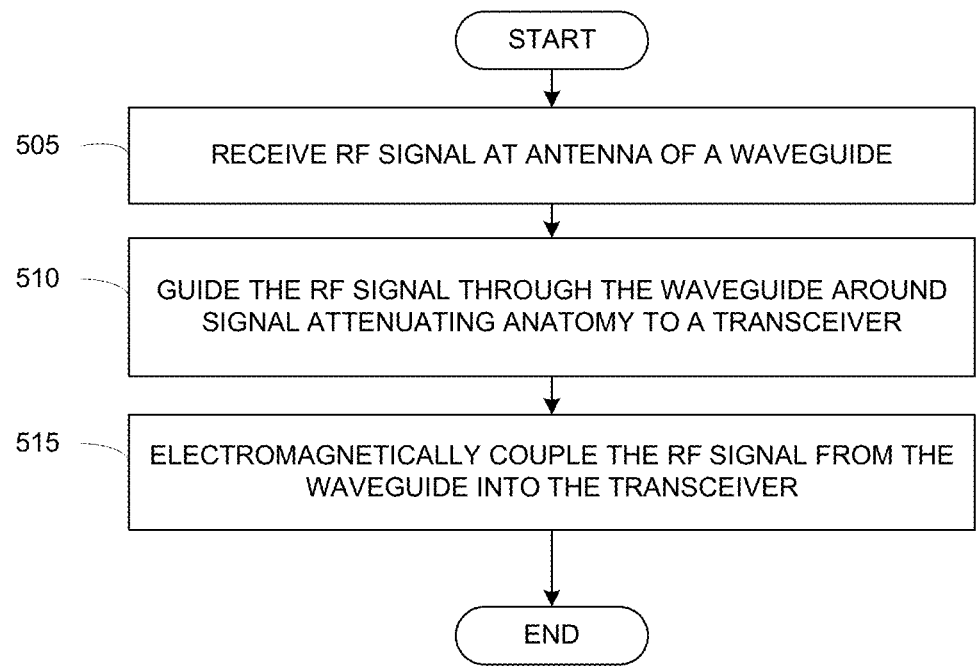
FIG. 5 illustrates an example method for using a waveguide to transmit an RF signal around anatomy according to this disclosure.

FIG. 5 illustrates an example method for using a waveguide to receive an RF signal that would normally be attenuated by the anatomy 105 according to this disclosure. The method may be performed by, for example, the HMD 200 of FIG. 2, which may also be the HMD 102 or 103 of FIG. 1A or 1B. Any suitable configuration of waveguide may be used, for example as described in FIGS. 3A-3J or FIG. 4.

The process begins at step 505 by receiving an RF signal at an antenna of a waveguide. The RF signal may originate from, for example, an electronic device that is streaming content to an HMD. A transceiver of the HMD may be located on a first side of an object, such as human anatomy, that attenuates RF energy passing through it. The electronic device may be on a second side of the anatomy so that the RF signal is attenuated when received at an antenna contained in a transceiver of the HMD. The waveguide may be shaped so that the antenna is formed at the distal end of the waveguide and is positioned in a portion of the HMD that is located on the second side of the anatomy. The signal is accordingly received by the antenna of the waveguide without significant attenuation.

At step 510, the received RF signal is guided through the waveguide around the signal attenuating anatomy towards the transceiver. At step 515, the RF signal is electromagnetically coupled from the waveguide into the transceiver, where it may be processed. In some embodiments, the RF signal is coupled through the antenna of the transceiver. In some embodiments, multiple waveguides may be positioned on different sides of the anatomy, thereby allowing for the method to be performed with signals received from those different sides of the anatomy.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A wearable, wireless-communication device, the device comprising:
   a transceiver positioned on a first side of the device, the transceiver comprising at least a first antenna configured to receive radio frequency (RF) signals transmitted toward the first side of the device, the device wearable about an object that attenuates reception, by the first antenna, of RF signals transmitted toward a second side of the device;
   a waveguide electromagnetically coupled to the transceiver, the waveguide terminating in at least a second antenna positioned on the second side of the device, the second antenna configured to receive the RF signals transmitted toward the second side of the device, the waveguide shaped to direct the RF signals received by the second antenna around the object to the transceiver; and
   a second waveguide electromagnetically coupled to the transceiver, the second waveguide terminating in at least a third antenna positioned on a third side of the device,
   wherein the third antenna is configured to receive RF signals transmitted toward the third side of the device, and
   wherein the second waveguide is shaped to direct the RF signals received by the third antenna around the object to the transceiver.

2. The wireless-communication device of claim 1, further comprising:
   a third waveguide electromagnetically coupled to the transceiver, the third waveguide terminating in at least a fourth antenna positioned on a fourth side of the device,
   wherein the fourth antenna configured to receive RF signals transmitted toward the fourth side of the device, and
   wherein the third waveguide shaped to direct the RF signals received by the fourth antenna around the object to the transceiver.

3. The wireless-communication device of claim 1, further comprising:
   a second waveguide electromagnetically coupled to the transceiver, the second waveguide terminating in a third antenna and a fourth antenna on opposite ends of the waveguide,
   wherein the third and fourth antennas positioned on third and fourth sides of the device, respectively, the third and fourth antennas configured to receive RF signals transmitted towards the third and fourth sides of the device, respectively, and
   wherein the second waveguide is shaped to direct the RF signals received by the third and fourth antennas, respectively, around the object to the transceiver.

4. The wireless-communication device of claim 1, wherein the object is a piece of human anatomy.

5. The wireless-communication device of claim 1, wherein the waveguide comprises a solid dielectric material.

6. The wireless-communication device of claim 1, wherein the waveguide comprises a hollow, slotted metal strip.

7. The wireless-communication device of claim 1, wherein the second antenna is configured to receive millimeter wave RF signals and the waveguide is configured to guide the millimeter wave RF signals to the transceiver.

8. The wireless-communication device of claim 1, wherein the second antenna is a portion of the waveguide and comprises a same material as the waveguide.

9. A wearable, wireless-communication device, the device comprising:
   a transceiver positioned on a first side of the device, the transceiver comprising a first antenna configured to receive radio frequency (RF) signals transmitted toward the first side of the device, the device wearable about an object that attenuates reception, by the first antenna, of RF signals transmitted toward a second or a third side of the device; and
   a waveguide electromagnetically coupled to the transceiver, the waveguide terminating in at least a second antenna positioned on the second side of the device and a third antenna positioned on the third side of the device, the waveguide shaped to direct received RF signals around the object to the transceiver,
   wherein the second antenna is configured to receive the RF signals transmitted toward the second side of the device,
   wherein the third antenna is configured to receive the RF signals transmitted toward the third side of the device,
   wherein the second and third antennas are part of the waveguide and taper towards distal ends of the waveguide.

10. The wireless-communication device of claim 9, further comprising:
    a second waveguide electromagnetically coupled to the transceiver, the second waveguide terminating in at least a fourth antenna positioned on a fourth side of the device,
    wherein the fourth antenna is configured to receive RF signals transmitted toward the fourth side of the device, the fourth antenna comprising a same material as the second waveguide and tapering towards a distal end of the second waveguide, and
    wherein the second waveguide is shaped to direct received RF signals around the object to the transceiver.

11. The wireless-communication device of claim 9, wherein the object is a piece of human anatomy.

12. The wireless-communication device of claim 9, wherein the waveguide comprises a solid dielectric material.

13. The wireless-communication device of claim 9, wherein the second and third antennas are configured to receive millimeter wave RF signals and the waveguide is configured to guide the millimeter wave RF signals to the transceiver.

14. A method for wireless communication by a wearable, wireless-communication device, the method comprising:
receiving, by at least a first antenna of a waveguide, a radio frequency (RF) signal transmitted towards a first side of the device, the first antenna positioned on the first side of the device; and
guiding the RF signal through the waveguide to a transceiver positioned on a second side of the device, the transceiver comprising at least a second antenna configured to receive RF signals transmitted toward the second side of the device;
electromagnetically coupling the RF signal from the waveguide into the transceiver;
receiving a second RF signal by at least a third antenna of a second waveguide, the third antenna positioned on a third side of the device;
guiding the second RF signal through the second waveguide to the transceiver; and
electromagnetically coupling the second RF signal from the second waveguide into the transceiver,
wherein the device is wearable about an object that attenuates reception, by the second antenna, of RF signals transmitted toward the first side of the device.

15. The method of claim 14, further comprising:
receiving a third RF signal by at least a fourth antenna of a third waveguide, at the fourth antenna positioned on a fourth side of the device;
guiding the third RF signal through the third waveguide to the transceiver; and
electromagnetically coupling the third RF signal from the third waveguide into the transceiver.

16. The method of claim 14, wherein the object is a piece of human anatomy.

17. The method of claim 14, wherein the waveguide comprises a solid dielectric material.

18. The method of claim 14, wherein receiving the RF signal further comprises receiving a millimeter wave RF signal.

* * * * *